(12) United States Patent
Miao et al.

(10) Patent No.: US 10,416,344 B2
(45) Date of Patent: Sep. 17, 2019

(54) INSPECTION DEVICES FOR QUARANTINE

(71) Applicants: CINTS CO. LTD., Beijing (CN); NUCTECH COMPANY LIMITED, Beijing (CN)

(72) Inventors: Qitian Miao, Beijing (CN); Zhiqiang Chen, Beijing (CN); Li Zhang, Beijing (CN); Ming Huang, Beijing (CN); Yunda Sun, Beijing (CN); Ming Hu, Beijing (CN); Qingping Huang, Beijing (CN); Jie Xia, Beijing (CN); Lei Lei, Beijing (CN)

(73) Assignees: CINTS CO. LTD., Beijing (CN); NUCTECH COMPANY LIMITED, Beijing (CN)

( * ) Notice: Subject to any disclaimer, the term of this patent is extended or adjusted under 35 U.S.C. 154(b) by 146 days.

(21) Appl. No.: 15/279,239

(22) Filed: Sep. 28, 2016

(65) Prior Publication Data

US 2017/0184757 A1   Jun. 29, 2017

(30) Foreign Application Priority Data

Dec. 29, 2015 (CN) .......................... 2015 1 1009740

(51) Int. Cl.
*G01V 5/00* (2006.01)

(52) U.S. Cl.
CPC ............ *G01V 5/005* (2013.01); *G01V 5/0041* (2013.01)

(58) Field of Classification Search
CPC .............................. G01V 5/005; G01V 5/0041
USPC .......................................................... 378/57
See application file for complete search history.

(56) References Cited

U.S. PATENT DOCUMENTS

| 4,539,648 A * | 9/1985 | Schatzki ............ G01V 5/0008 250/358.1 |
| 5,367,552 A | 11/1994 | Peschmann |
| 8,036,337 B2 | 10/2011 | Zhang et al. |
| 8,320,523 B2 | 11/2012 | Zhang et al. |
| 9,412,019 B2 | 8/2016 | Chen et al. |
| 9,465,975 B2 | 10/2016 | Li et al. |

(Continued)

FOREIGN PATENT DOCUMENTS

| CN | 201130157 Y | 10/2008 |
| CN | 101403710 A | 4/2009 |

(Continued)

OTHER PUBLICATIONS

Extended European Search Report as issued in European Patent Application No. 16191227.4, dated May 17, 2017.

(Continued)

*Primary Examiner* — Courtney D Thomas
(74) *Attorney, Agent, or Firm* — Pillsbury Winthrop Shaw Pittman LLP

(57) ABSTRACT

An inspection device for quarantine that includes a dual-energy CT apparatus capable of distinguishing substances, a DR apparatus, a substance identification system capable of enhancing display of an object (plant, animal, meat, etc.) focused for quarantine and automatically so labeling, and an image processing system capable of highlighting a suspect of quarantine and providing a corresponding automatic alarm. Compared to the prior art, the present disclosure can highlight a focused object for quarantine, which may improve accuracy and efficiency of inspection for quarantine at a port.

20 Claims, 3 Drawing Sheets

(56) References Cited

U.S. PATENT DOCUMENTS

| | | | |
|---|---|---|---|
| 9,495,772 | B2 | 11/2016 | Shen et al. |
| 10,102,641 | B2 | 10/2018 | Chen et al. |
| 2005/0276376 | A1 | 12/2005 | Eilbert |
| 2009/0010386 | A1* | 1/2009 | Peschmann .......... G01N 23/223 378/57 |
| 2009/0129544 | A1* | 5/2009 | Chen ...................... G01N 23/04 378/62 |
| 2010/0284514 | A1* | 11/2010 | Zhang ..................... G01N 9/24 378/53 |

FOREIGN PATENT DOCUMENTS

| | | |
|---|---|---|
| CN | 104435783 A | 5/2009 |
| CN | 101470082 A | 7/2009 |
| CN | 101641589 A | 2/2010 |
| CN | 102162798 A | 8/2011 |
| CN | 102435620 A | 5/2012 |
| CN | 102565107 A | 7/2012 |
| CN | 102590234 A | 7/2012 |
| CN | 103900503 A | 7/2014 |
| CN | 103903297 A | 7/2014 |
| CN | 103913472 A | 7/2014 |
| CN | 103926628 A | 7/2014 |
| CN | 204008508 U | 12/2014 |
| CN | 105004741 A | 10/2015 |
| CN | 205353380 U | 6/2016 |
| EP | 0 223 545 A2 | 5/1987 |
| EP | 2 309 257 A1 | 4/2011 |
| KR | 10-2015-0117417 A | 10/2015 |
| WO | WO 2013/078344 A1 | 5/2013 |

OTHER PUBLICATIONS

Office Action as issued in Chinese Patent Application No. 201511009740.2, dated Feb. 24, 2018.
Examination Report as issued in Australian Patent Application No. 2016235025 dated Aug. 28, 2017.
International Search Report and the Written Opinion of the International Searching Authority as issued in International Patent Application No. PCT/CN2016/097577, dated Nov. 24, 2016.
Office Action as issued in Canadian Patent Application No. 2,943,764, dated Jul. 26, 2018.
Taina, I. A., et al., "Application of X-ray computed tomography to soil science: A literature review," *Canadian Journal of Soil Science, Department of Land Resource Science, University of Guelph,* <http://www.nrcresearchpress.com/doi/10.4141/CJSS06027#.W1XTGdVKhEZ>, Oct. 2, 2007, 25 pages.
Office Action as issued in U.S. Appl. No. 15/279,207, dated Jul. 27, 2018.
Office Action as issued in Chinese Patent Application No. 201511009740.2, dated May 4, 2017.
Final Office Action as issued in U.S. Appl. No. 15/279,207, dated Jan. 18, 2019.
Office Action as issued in Chinese Patent Application No. 201511010081.4, dated Dec. 29, 2018.
Notice of Allowance as issued in U.S. Appl. No. 15/279,207, dated May 24, 2019.

* cited by examiner

INSPECTION DEVICES FOR QUARANTINE

TECHNICAL FIELD

The present disclosure relates to the field of radiation imaging detection, and in particular, to inspection devices for quarantine.

BACKGROUND

Perspective imaging is a desired means of imaging in the field of security. A DECT (Dual-Energy Computed Tomography) technology based on DR (Digital-Radiography) and CT (Computed Tomography) may obtain an effective atomic number and/or an equivalent density within a scanned object while 3D structure information of the scanned object is acquired, and DECT technology is an advantageous technology for substance identification.

SUMMARY

A traditional dual-energy CT inspection device generally distinguishes substances to be scanned into three categories of inorganics (or metal), organics, and mixture, mainly for identifying objects such as explosives and/or drugs. For the field of quarantine, however, objects on which inspection in ports focuses, most objects are plants, animals and their products and so on, such as mammals, birds, fish and other pets, meat and meat products, aquatic products, fresh fruits, vegetables, seedlings, flowers and other plant material capable of reproduction, etc., which may have a significant impact on ecological security.

The above objects on which quarantine inspection focuses are mostly organic. Since attenuation coefficients of X-rays in most organics is low, there may be a problem with a common CT inspection device that an area of an organic material has high brightness and low contrast in an image obtained from a common CT inspection device, which causes great difficulty in distinguishing organics using a common CT image. Therefore, an experienced image judging officer is usually required to judge whether organics belong to contraband. However, since there is significant difference between skill levels of image judging officers, and artificial image judgment results are easily influenced by subjective factors, a high false positive rate is easily caused.

In order to solve one or more of the above problems, the present disclosure provides inspection devices for quarantine.

In a first aspect of the present disclosure, an inspection device for quarantine is provided. The inspection device for quarantine includes a bearing mechanism configured to bear an object being scanned; a first X-ray source arranged at a side of the bearing mechanism and configured to emit X-rays substantially perpendicular to a movement direction of the bearing mechanism; a first detection and data collection apparatus arranged at another side of the bearing mechanism opposite to the first X-ray source, wherein an inspection area is formed between the first X-ray source and the bearing mechanism; a controller connected to the bearing mechanism, the first X-ray source and the first detection and data collection apparatus, and configured to control the bearing mechanism and the first X-ray source to perform a CT scan on the object being scanned; and a computer connected to the controller and the first detection and data collection apparatus, and configured to store data obtained by the CT scan, perform image reconstruction, identify a concerning substance for quarantine, and output an identification result of the concerning substance for quarantine.

According to an embodiment of the present disclosure, the inspection device further includes a second X-ray source arranged in parallel with the first X-ray source, which is arranged at the side of the bearing mechanism and configured to emit X-rays substantially perpendicular to a movement direction of the bearing mechanism; a second detection and data collection apparatus, arranged at the other side of the bearing mechanism opposite to the second X-ray source, wherein an inspection area is formed between the second X-ray source and the bearing mechanism; wherein the controller is connected to the second X-ray source and the second detection and data collection apparatus, and controls the second X-ray source and the second detection and data collection apparatus to perform a transmission scan on the object being scanned; and the computer is connected to the second detection and data collection apparatus, and stores data obtained by the transmission scan.

According to an embodiment of the present disclosure, the controller is connected to the bearing mechanism, the first X-ray source, the second X-ray source, the first detection and data collection apparatus and the second detection and data collection apparatus by a control line, and controls the CT scan and the transmission scan to be performed synchronously.

According to an embodiment of the present disclosure, the controller is connected to the first X-ray source and the first detection and data collection apparatus, so that the first X-ray source emits continuous energy spectrum X-rays for performing a dual-energy CT scan or a multi-energy CT scan in combination with a dual-energy detector or an energy spectrum detector; or so that the first X-ray source emits high and low energy X-rays for performing a dual-energy CT scan.

According to an embodiment of the present disclosure, the X-ray source is a single X-ray source point or distributed X-ray sources.

According to an embodiment of the present disclosure, the first X-ray source and the first detection and data collection apparatus are arranged opposite to each other, implementing a CT structure with a gantry or a CT structure without a gantry.

According to an embodiment of the present disclosure, the computer has functions of enhancing display of an object focused in quarantine, automatic labeling, highlighting a suspect object focused in quarantine, and automatic alarming.

According to an embodiment of the present disclosure, the computer can automatically hide one or more non-organic components in the object being scanned when a reconstructed image is displayed.

According to an embodiment of the present disclosure, the computer identifies and distinguishes organics, and automatically labels the object focused in quarantine.

According to an embodiment of the present disclosure, the computer can automatically segment mixed objects being scanned into separated articles.

According to an embodiment of the present disclosure, the computer highlights the suspect object focused in quarantine according to a 3D shape of the article in connection with a substance identification result, and alarms automatically.

According to an embodiment of the present disclosure, the computer automatically records shape features of contrabands which are frequently labeled by a user.

According to an embodiment of the present disclosure, the computer is connected to a cloud server, and uploads inspection data to the cloud server or updates a database from the cloud server.

The inspection devices may be used for providing a 3D image of the object being scanned, performing substance identification on the object being scanned, and automatically labeling a substance focused in quarantine. Additionally, the inspection devices can highlight the suspect object focused in quarantine according to the 3D image, so that the image may be judged more intuitively. By using the inspection device, accuracy and efficiency of inspection for quarantine at a port can be improved.

DETAILED DESCRIPTION

Hereinafter, preferred embodiments of the present disclosure will be described in detail with reference to the drawings. Although shown in different drawings, the same reference numbers represent the same or similar components. For clarity and conciseness, descriptions of well-known functions and structures will be omitted here to avoid obscuring the subject matter of the present disclosure. Embodiments below are used for explaining the present disclosure, but do not limit the scope of the present disclosure.

Figure 1:
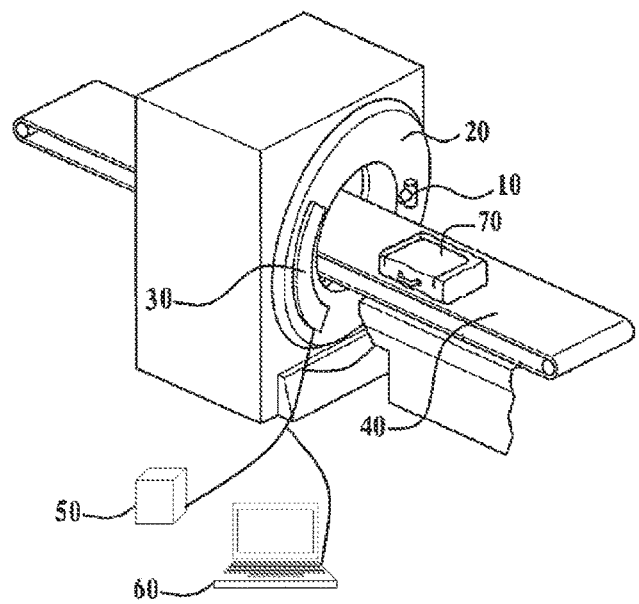
FIG. 1 shows a schematic diagram of an inspection device according to an embodiment of the present disclosure.

FIG. 1 shows a schematic diagram of an inspection device according to an embodiment of the present disclosure. As shown in FIG. 1, the inspection device according to the present embodiment is, in particular, a CT device for the field of quarantine. The CT device may include a gantry 20, a bearing mechanism 40, a controller 50, a computer 60, etc. The gantry 20 may include a ray source 10 for emitting X-rays, such as an X-ray machine, and a detection and collection apparatus 30. In some embodiments, the X-ray source may be enabled to emit continuous energy spectrum X-rays, and to perform a dual-energy CT scan or a multi-energy CT scan in combination with a dual-energy detector or an energy spectrum detector. In some embodiments, the X-ray source may be a dual-energy X-ray source, and the detector may also receive dual-energy or multi-energy X-rays, so as to perform a dual-energy X-ray inspection on an object 70 being scanned.

The bearing mechanism 40 bears the object 70 being scanned to go through a scan area between the ray source 10 and the detection and collection apparatus 30 of the gantry 20, during which the gantry 20 rotates around a heading direction of the object 70 being scanned so that the rays emitted from the ray source 10 can pass through the object 70 being scanned for performing the CT scan on the object 70 being scanned. The CT scan performed here may be a spiral scan, or a circular scan, or the like.

The detection and collection apparatus 30 may be a detector and a data collector in an integrated module structure, e.g., an array detector, which may be used for detecting the rays passing through an article being scanned so as to obtain an analog signal, and for converting the analog signal to a digital signal, thereby outputting projection data of the object 70 being scanned for the X-rays.

The controller 50 controls various components of the whole system to work synchronously. The computer 60 processes and reconstructs data collected by the data collector, and outputs the result. For example, after the object 70 being scanned is scanned successively by the CT device, the obtained dual-energy 3D image data are input to the computer 60; a substance identification system installed in the computer 60 performs substance identification on the object 70 being scanned according to the image data so as to obtain feature information of the substance, such as an equivalent atomic number, density etc., and tints the 3D image, automatically labeling the article which is judged as an object focused in quarantine (plant, animal, meat, etc.).

As shown in FIG. 1, the ray source 10 is arranged at one side of the object 70 being scanned; and the detection and collection apparatus 30, including the detector and the data collector, is arranged at another side of the object 70 being scanned and is used for obtaining transmission data and/or multi-angle projection data of the object 70 being scanned. A data amplifying circuit is included in the data collector, which may work in a (current) integrated mode or a pulse (counting) mode. A data output cable of the detection and collection apparatus 30 is connected to the controller 50 and the computer 60, and the collected data are stored in the computer 60 according to a trigger command. Although a CT structure with a gantry is used in the illustrated embodiment, it will be understood by the skilled in the art that the ray source and the detector may utilize a CT structure without a gantry in other embodiments.

Figure 2:
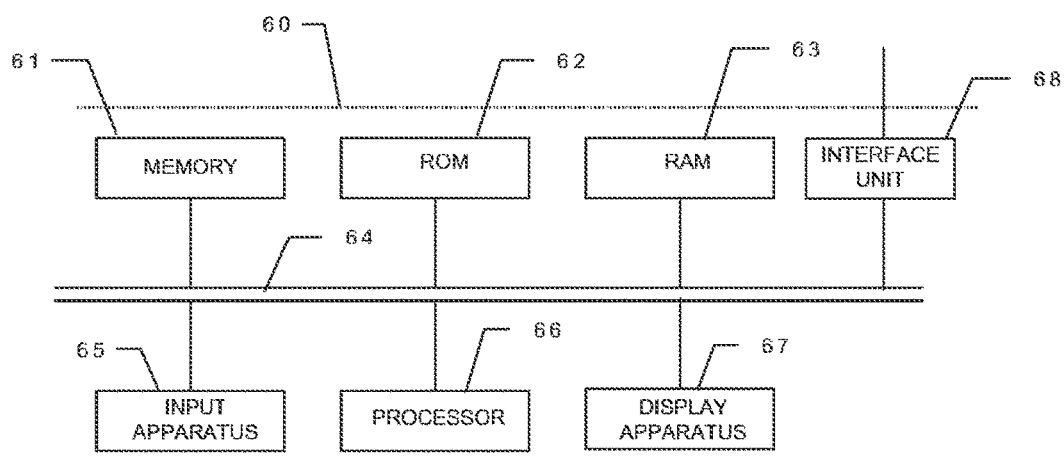
FIG. 2 shows a schematic structure diagram of a computer in the inspection device as shown in FIG. 1.

FIG. 2 shows a schematic structure diagram of a computer 60 as shown in FIG. 1. As shown in FIG. 2, the data collected by the data collector are stored in a memory 61 via an interface unit 68 and a bus 64. Configuration data and program of a computer data processor are stored in a ROM (Read-Only Memory) 62. A RAM (Random-Access Memory) 63 is used for temporarily storing various data during operations of a processor 66. In addition, computer programs for data processing are also stored in the memory 61, e.g., a substance identification program, an image processing program, etc. The internal bus 64 connects the memory 61, the ROM 62, the RAM 63, an input apparatus 65, the processor 66, a display apparatus 67 and the interface unit 68.

After the user inputs an operation instruction by the input apparatus 65 such as a keyboard and a mouse, instruction codes of the computer programs instruct the processor 66 to execute a predetermined data processing algorithm; and to display a data processing result on the display apparatus 67 such as a LCD display or to output the processing result directly in a form of a hard copy, such as printing, after the data processing result is obtained.

The projection data obtained by the detection and collection apparatus 30 are stored in the computer 60 for reconstruction of the CT image, so as to obtain slice image data of the object 70 being scanned. Then, the computer 60 extracts a 3D shape parameter of at least one article of the object 70 being scanned from the slice image data, for providing a judgment basis for judging whether the object 70 to be scanned is contraband. According to other embodiments, the CT imaging system as illustrated above also may be a dual-energy CT system, i.e., the X-ray source 10 on the gantry 20 may emit high-energy rays and low-energy rays. After the detection and collection apparatus 30 detects projection data at different energy levels, dual-energy CT reconstruction may be performed by the computer data processor 60 to obtain the equivalent atomic numbers and/or density data of various slices of the object 70 being scanned. In this case, the computer 60 may obtain a substance attribute of the object 70 being scanned, e.g. a plant or meat, for providing a judgment basis for judging whether the object 70 to be scanned is contraband.

Figure 3:
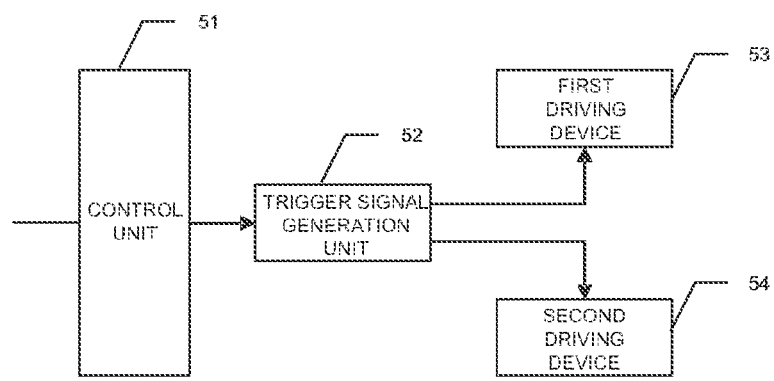
FIG. 3 shows a schematic structure diagram of a controller in an inspection device according to an embodiment of the present disclosure.

FIG. 3 shows a schematic structure diagram of a controller according to an embodiment of the present disclosure. As shown in FIG. 3, the controller 50 includes: a control unit 51, configured to control the ray source 10, the bearing mechanism 40 and the detection and collection apparatus 30 according to instructions from the computer 60; a trigger signal generation unit 52, configured to generate a trigger command for triggering actions of the ray source 10, the detection and collection apparatus 40 and the bearing mechanism 40 under control of the control unit; a first driving device 53, configured to drive the bearing mechanism 40 to convey the object 70 being scanned according to the trigger command generated by the trigger signal generation unit 52 under the control of the control unit 51; and a second driving device 54, configured to drive the gantry 20 to rotate according to the trigger command generated by the trigger signal generation unit 52 under the control of the control unit 51. The projection data obtained by the detection and collection apparatus 30 are stored in the computer 60 for reconstruction of the CT data, so as to obtain the slice image data of the object 70 being scanned. Then, the computer 60 identifies the atomic number of the substance by executing software, facilitating the work of the image judging officer. According to other embodiments, the CT imaging system as illustrated above may also be a dual-energy CT system, i.e., the X-ray source 10 on the gantry 20 may emit high-energy rays and low-energy rays. After the detection and collection apparatus 30 detects the projection data at different energy levels, the dual-energy CT reconstruction may be performed by the computer 60 to obtain the equivalent atomic numbers and/or density data of various slices of the object 70 being scanned.

Figure 4:
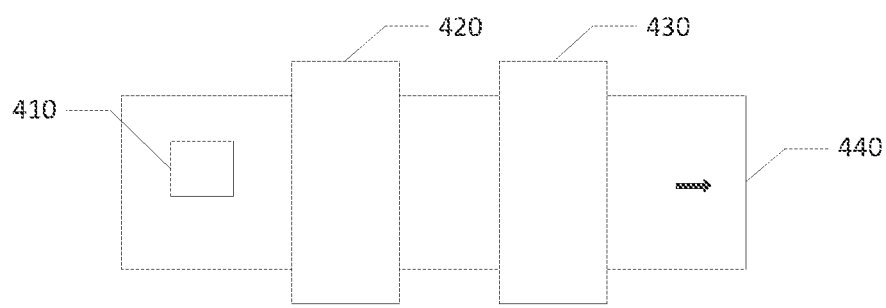
FIG. 4 shows a schematic diagram of an inspection device according to another embodiment of the present disclosure.

FIG. 4 shows a schematic diagram of an inspection device according to another embodiment of the present disclosure. In the embodiment as shown in FIG. 4, an object 410 being scanned is placed on a bearing structure 400 for inspection, which sequentially passes through a DR system 420 and a dual-energy CT system 430. In the embodiment as shown in FIG. 4, the dual-energy CT system 430 and the DR system 420 may be operated synchronously.

Figure 5:
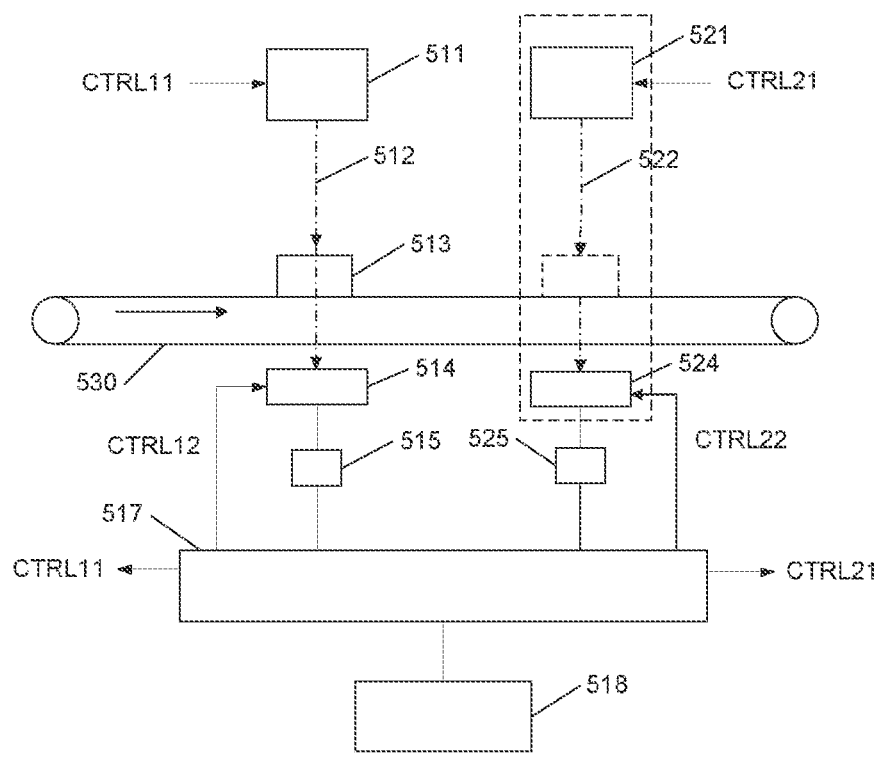
FIG. 5 shows a schematic structure diagram of the inspection device as shown in FIG. 4.

FIG. 5 shows a schematic structure diagram of the inspection device as shown in FIG. 4 in detail. The inspection device as shown in FIG. 5 includes a DR system on the left and a dual-energy CT system on the right, both of which share a bearing mechanism 530, such as a belt, bearing an object 513 being scanned to move ahead.

An X-ray source 511 for DR emits X-rays 512, which transmit through the object 513 being scanned on the bearing mechanism 530; a transmission signal is received by a detector module 514; an analog signal is converted by a collection circuit 515 into a digital signal, which is transmitted to a controller 517 and a computer 518, etc. A transmission image of the object 513 being scanned is obtained in the computer 518, which is stored in a memory or is displayed.

In some embodiments, the ray source 511 may include a single X-ray source point, or include a plurality of X-ray generators, e.g., distributed X-ray sources including a plurality of X-ray source points.

As shown in FIG. 5, the bearing mechanism 530 bears the object 513 being scanned to go through a scan area between the ray source 511 and the detector 514. In some embodiments, the detector 514 and the collection circuit 515 are a detector and a data collector in an integrated module structure, e.g., a plurality of detectors, for detecting the rays passing through an article being scanned so as to obtain the analog signal, and for converting the analog signal to the digital signal, thereby outputting projection data of the object 513 being scanned for the X-rays. The controller 517 controls various components of the whole system to work synchronously. The computer 518 processes and reconstructs data collected by the data collector, and outputs the result.

According to the embodiment, the detector 514 and the collection circuit 515 are used for obtaining transmission data of the object 513 being scanned. A data amplifying circuit is included in the collection circuit 515, which may work in a (current) integrated manner or a pulse (counting) manner. The collection circuit 515 is connected to the controller 517 and the computer 518, and the collected data are stored in the computer 60 according to a trigger command.

In some embodiments, the detector module 514 may include a plurality of detection units for receiving the X-rays which pass through the object being scanned. The data collection circuit 515 is coupled to the detector module 514 for converting a signal generated by the detector module 514 to detection data. The controller 517 is connected via a control line CTRL11 to the ray source 511 and is connected via a control line CTRL12 to the detector module 514 which is in turn connected to the data collection circuit 515, so as to control at least one X-ray generator of the ray source to generate the X-rays which are emitted for passing through the object being scanned as the object being scanned moves. In addition, the controller 517 controls the detector module 514 and the data collection circuit 515 to obtain the detection data. The computer 518 reconstructs the image of the object being scanned based on the detection data.

As the object being scanned moves ahead, the dual-energy CT system performs the CT scan on the object being scanned. A X-ray source 521 for CT emits X-rays 522, which pass through the object 513 being scanned on the bearing mechanism 530. As the object moves forward, the ray source 521 and a detector 524 are rotated for the CT scan, a projection signal is received by the detector module 524, an analog signal is converted by a collection circuit 525 into a digital signal, which is sent to the controller 517 and the computer 518, etc. Slice images of the object 513 being scanned are obtained in the computer 518, which are stored in the memory or are displayed.

In some embodiments, the detector module 524 includes a plurality of detection units for receiving the X-rays which pass through the object being scanned. The data collection circuit 525 is coupled to the detector module 524 for converting a signal generated by the detector module 524 to detection data. The controller 517 is connected via a control line CTRL21 to the ray source 521 and is connected via a control line CTRL22 to the detector module 524 which is in turn connected to the data collection circuit 525, so as to control two high and low energy X-ray generators of the ray source to alternately generate high and low energy X-rays which are emitted for passing through the object being scanned as the object being scanned moves, achieving a dual-energy CT scan. In addition, the controller 517 controls the detector module 524 and the data collection circuit 525 to obtain the projection data. The computer 518 reconstructs the image of the object being scanned based on the projection data, and performs the substance identification.

For example, in the embodiment as shown in FIG. 4, the object 410 being scanned goes through the DR system 420 and the dual-energy CT system 430 sequentially, and the obtained 2D and dual-energy 3D image data are input to the computer for substance identification. The substance identification system installed in the computer performs substance identification on the object being scanned according to the image data so as to obtain information of different substances, such as the equivalent atomic numbers, densities, etc., and tints the 2D image and the 3D image, automatically labeling the article which is judged as the object focused in quarantine (plant, animal, meat, etc.).

In an embodiment of the present disclosure, the substance identification system may hide a part of the object being scanned which is identified to be inorganic, so as to highlight one or more organic components of the object being scanned.

In an embodiment of the present disclosure, the substance identification system may further identify and distinguish organics more accurately, respectively labeling plants, animals, meat and their products, etc. with different colors. In addition, the image which has been labeled by substance identification is input to the image processing system in the computer 518, which in turn highlights the suspect of quarantine, and alarms automatically.

In an embodiment of the present disclosure, the image processing system in the computer 518 may automatically segment the image of the object being scanned which comprises a mixture of various kinds of articles into separate articles according to their profile edges, facilitating the inspection officer to judge the image.

In an embodiment of the present disclosure, the image processing system in the computer 518 may compare an appearance of the 3D image of the object being scanned with a suspect image database in connection with the substance identification result, and further highlight the suspect of quarantine, so as to improve accuracy of an automatic alarm.

In an embodiment of the present disclosure, the image processing system in the computer 518 may have a self-learning function, and may automatically identify shape features of contrabands which are frequently labeled by a user and record them in the database, so as to improve accuracy of the automatic alarm.

In an embodiment of the present disclosure, the image processing system in the computer 518 may be configured with a cloud data collection function, e.g., may be connected to a cloud server for uploading the inspection data to the cloud server. The user may authorize different image read rights of the cloud server to different persons, or enable the image read rights of the cloud server to have access to another management system.

In an embodiment of the present disclosure, the image processing system in the computer 518 may be configured with a database cloud update function, e.g., may be connected to the cloud server for updating an alarm database from the cloud.

Although the inspection device for quarantine according to the present disclosure is described in connection with particular embodiments, the skilled in the art may apply the inspection device to other fields for solving an inspection problem in other industries. Therefore, various modifications, improvements, expansions and applications which can be made by those skilled in the art based on the embodiments of the present disclosure are to be encompassed by the scope of the present disclosure as defined by the claims and their equivalents.

We claim:

1. An inspection device comprising:
   a bearing mechanism configured to bear an object being scanned;
   a first X-ray source arranged at a first side of the bearing mechanism and configured to emit X-rays substantially perpendicular to a movement direction of the bearing mechanism, wherein an inspection area is formed between the first X-ray source and the bearing mechanism;
   a first detection and data collection apparatus arranged at a second side of the bearing mechanism opposite to the first X-ray source;
   a controller connected to the bearing mechanism, the first X-ray source and the first detection and data collection apparatus, and configured to control the bearing mechanism and the first X-ray source to perform a CT scan on the object being scanned; and
   a computer connected to the controller and the first detection and data collection apparatus, and configured to store data obtained by the CT scan, perform image reconstruction, identify an inspected and quarantined substance, and output an identification result of the inspected and quarantined substance,
   wherein the computer is further configured to identify one or more selected from: a plant, an animal, meat, a plant product, an animal product and/or a meat product as the identification result and label the identification result with a different color than another substance in a display associated with the object being scanned.

2. The inspection device according to claim 1, further comprising:
   a second X-ray source arranged in parallel with the first X-ray source, the second X-ray source arranged at the first side of the bearing mechanism and configured to emit X-rays substantially perpendicular to the movement direction of the bearing mechanism; and
   a second detection and data collection apparatus arranged at the second side of the bearing mechanism opposite to the second X-ray source, wherein a second inspection area is formed between the second X-ray source and the bearing mechanism,
   wherein the controller is connected to the second X-ray source and the second detection and data collection apparatus, and is configured to control the second X-ray source and the second detection and data collection apparatus to perform a transmission scan on the object being scanned, and
   the computer is connected to the second detection and data collection apparatus, and is configured to store data obtained by the transmission scan.

3. The inspection device according to claim 2, wherein the controller is connected to the bearing mechanism, the first X-ray source, the second X-ray source, the first detection and data collection apparatus and the second detection and data collection apparatus by a control line, and is configured to control the CT scan and the transmission scan to be performed synchronously.

4. The inspection device according to claim 2, wherein the controller is connected to the first X-ray source and the first detection and data collection apparatus, and is configured to cause the first X-ray source to emit continuous energy spectrum X-rays for performing a dual-energy CT scan or a multi-energy CT scan in combination with a dual-energy detector or an energy spectrum detector; or to cause the first X-ray source to emit high and low energy X-rays for performing a dual-energy CT scan.

5. The inspection device according to claim 1, wherein the first X-ray source is a single X-ray source point or distributed X-ray sources.

6. The inspection device according to claim 1, wherein the first X-ray source and the first detection and the data collection apparatus are arranged opposite to each other, so as to implement a CT structure with a gantry or a CT structure without a gantry.

7. The inspection device according to claim 1, wherein the computer is configured to enhance display of an object focused for inspection and quarantine, provide automatic labeling, provide highlighting a suspect of quarantine, and provide automatic alarming.

8. The inspection device according to claim 1, wherein the computer is configured to automatically hide a non-organic component in the object being scanned when a reconstructed image is displayed.

9. The inspection device according to claim 1, wherein the computer is configured to identify and distinguish organics, and automatically label an object focused for quarantine in the object being scanned.

10. The inspection device according to claim 1, wherein the computer is configured to automatically segment mixed objects being scanned into separated articles.

11. The inspection device according to claim 1, wherein the computer is configured to highlight the inspected and quarantined substance according to a 3D shape of the object being scanned in connection with the identification result, and cause an automatic alarm.

12. The inspection device according to claim 1, wherein the computer is configured to automatically record shape features of contrabands which are frequently labeled by a user.

13. The inspection device according to claim 1, wherein the computer is connected to a cloud server, and configured to upload inspection data to the cloud server or update a database from the cloud server.

14. An inspection method comprising:
    causing an object to be scanned by a bearing mechanism;
    emitting X-rays, from a first X-ray source arranged at a first side of the bearing mechanism, in a direction substantially perpendicular to a movement direction of the bearing mechanism, wherein an inspection area is formed between the first X-ray source and the bearing mechanism;
    detecting X-rays passing through the object using a first detection and data collection apparatus arranged at a second side of the bearing mechanism opposite to the first X-ray source;
    controlling the bearing mechanism and the first X-ray source using a controller connected to the bearing mechanism, the first X-ray source and the first detection and data collection apparatus, to perform a CT scan on the object being scanned;
    storing data obtained by the CT scan using a computer connected to the controller and the first detection and data collection apparatus;
    performing image reconstruction by the computer;
    identifying, by the computer, an inspected and quarantined substance using the reconstructed image; and
    outputting an identification result of the inspected and quarantined substance,
    wherein the identifying identifies one or more selected from: a plant, an animal, meat, a plant product, an animal product and/or a meat product as the identification result and the outputting labels the identification result with a different color than another substance in a display associated with the object being scanned.

15. The method according to claim 14, further comprising:
    emitting X-rays substantially perpendicular to the movement direction of the bearing mechanism using a second X-ray source arranged in parallel with the first X-ray source and which is arranged at the first side of the bearing mechanism;
    detecting X-rays from the second X-ray source passing through the object using a second detection and data collection apparatus arranged at the second side of the bearing mechanism opposite to the second X-ray source, wherein a second inspection area is formed between the second X-ray source and the bearing mechanism;
    controlling the second X-ray source and the second detection and data collection apparatus using the controller, to perform a transmission scan on the object being scanned; and
    storing data obtained by the transmission scan using the computer.

16. The method according to claim 15, comprising causing the first X-ray source to emit continuous energy spectrum X-rays for performing a dual-energy CT scan or a multi-energy CT scan in combination with a dual-energy detector or an energy spectrum detector; or causing the first X-ray source to emit high and low energy X-rays for performing a dual-energy CT scan.

17. The method according to claim 14, further comprising enhancing display of an object focused for inspection and quarantine, providing automatic labeling, providing highlighting of a suspect of quarantine, and providing automatic alarming.

18. The method according to claim 14, further comprising automatically hiding a non-organic component in the object being scanned when a reconstructed image is displayed.

19. The method according to claim 14, further comprising identifying and distinguishing, by the computer, organics, and automatically labelling an object focused for quarantine in the object being scanned.

20. The method according to claim 14, further comprising automatically segmenting mixed objects being scanned into separated articles.

* * * * *